O. H. WATKINS.
LAWN TRIMMER.
APPLICATION FILED JUNE 1, 1909.
956,654.
Patented May 3, 1910.
2 SHEETS—SHEET 1.
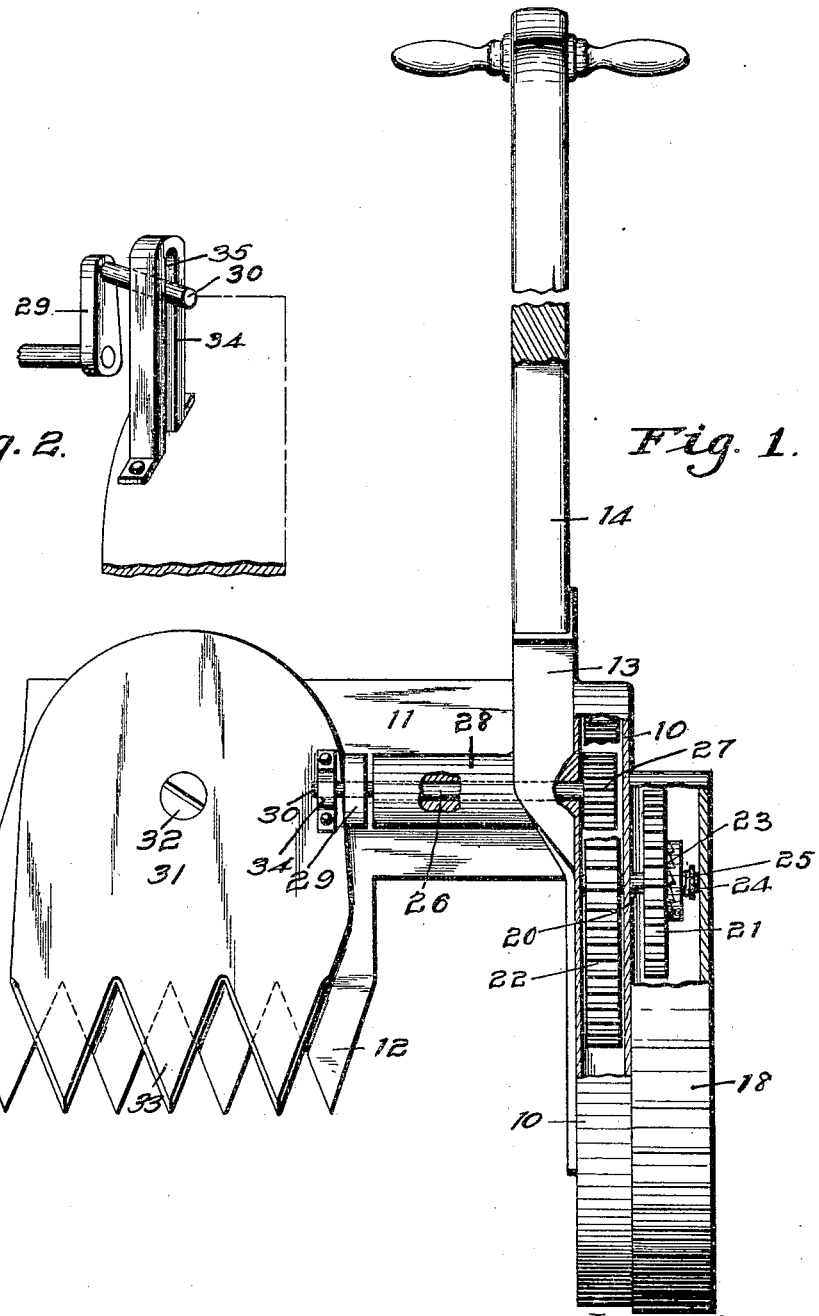
Witnesses.
F. C. Dahlberg.
A. G. Hague
Inventor.
O. H. Watkins.
by Orwig & Laul Atty's.

O. H. WATKINS.
LAWN TRIMMER.
APPLICATION FILED JUNE 1, 1909.
956,654.
Patented May 3, 1910.
2 SHEETS—SHEET 2.
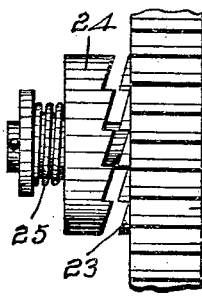
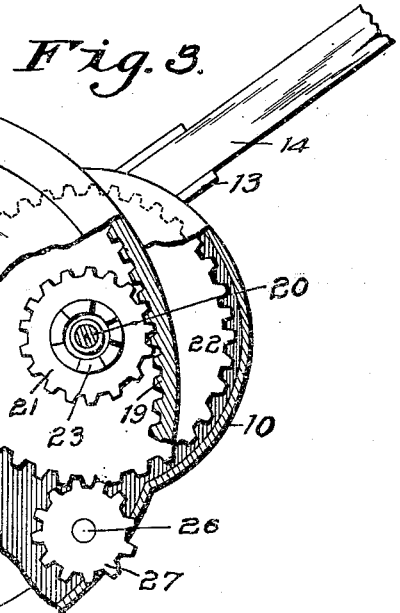
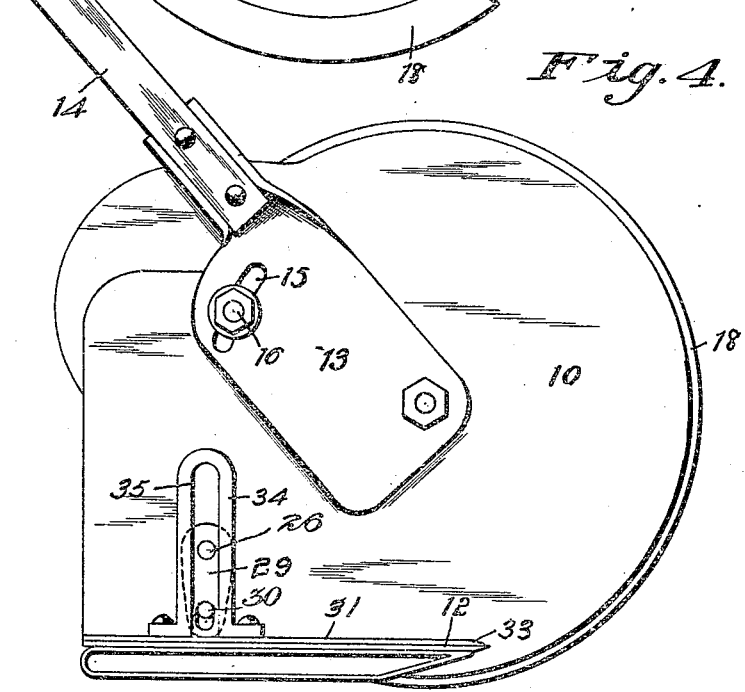
Witnesses.
F. C. Dahlberg.
A. G. Hague.
Inventor.
O. H. Watkins
by Orwig & Lane Atty's

UNITED STATES PATENT OFFICE.

ORLA H. WATKINS, OF AMES, IOWA.

LAWN-TRIMMER.

956,654.  Specification of Letters Patent.  Patented May 3, 1910.

Application filed June 1, 1909. Serial No. 499,300.

*To all whom it may concern:*

Be it known that I, ORLA H. WATKINS, a citizen of the United States, residing at Ames, in the county of Story and State of Iowa, have invented a certain new and useful Lawn-Trimmer, of which the following is a specification.

The object of my invention is to provide a lawn trimmer of simple, durable and inexpensive construction, and especially designed for trimming the edges of a lawn and for cutting grass around trees, bushes, or other objects.

A further object is to provide simple, durable, and easily operated means for operating the oscillating cutting blade.

A further object is to provide a device of this kind in which the traction wheel may be moved in a circle, the center of which is at the outer edge of the cutting blade, and the cutting blade will be actuated during the entire movement of the traction wheel around said circle so that the cutting blade may be placed close to a small bush or other object and the traction wheel moved in a circle around the same, and the grass will be cut all around and close to the bush or other object.

My invention consists in the construction, arrangement and combination of the various parts of the device whereby the objects contemplated are attained, as hereinafter more fully set forth, pointed out in my claims, and illustrated in the accompanying drawings, in which—

Figure 1 shows a top plan view of a complete lawn trimmer embodying my invention with parts broken away to show certain details of construction. Fig. 2 shows a detail, perspective view illustrating the connection between the crank shaft and the oscillating cutter blade. Fig. 3 shows a detail side view illustrating the gearing devices. Fig. 4 shows a side elevation of the device embodying my invention and taken from the side opposite that shown in Fig. 3; and Fig. 5 shows a detail view illustrating the ratchet clutch device for throwing the oscillating cutter blade out of gear when the traction wheel is moved backwardly.

Referring to the accompanying drawings, the main frame of the device is composed of a hollow casing 10 in which the gear wheels, hereinafter described, are contained. Extended laterally from the rear of the casing 10 and then forwardly is an arm 11 having, at its outer end, the stationary cutter blades 12. The central portions of these stationary cutting blades are arranged approximately in the perpendicular plane passing through the axis of the supporting wheel for purposes hereinafter made clear. Pivoted to the gear casing 10 is a plate 13 to which the handle 14 is attached. This plate 13 is provided with a slot 15 and a bolt 16 is fixed to the gear casing 10 and passed through said slot to limit the pivotal movement of the handle relative to the casing.

Mounted in the central portion of the casing is an axle 17 on which the traction wheel 18 is mounted. This traction wheel is provided with an internal gear 19. Rotatably mounted in the casing 10 is a shaft 20 having rotatably mounted thereon a pinion 21 in mesh with the gear teeth 19 and also having fixed thereon a large pinion 22. Formed on the pinion 21 is a ratchet wheel 23 and slidingly mounted on the shaft 20, adjacent to the ratchet wheel 23, is a ratchet wheel 24 normally held by a spring 25 in position in engagement with the ratchet wheel 23. This ratchet device is for the purpose of causing the pinion 22 to rotate only when the traction wheel is moving forwardly.

Mounted in the casing 10 is a shaft 26 having thereon a small pinion 27 in mesh with the large pinion 22. Said shaft is extended laterally over the arm 11 to a bearing 28 and on the outer end of the shaft is a crank 29 having a crank pin 30 fixed thereto.

Mounted upon the outer end of the arm 11 is an oscillating cutter blade 31 pivotally connected to the arm 11 by means of the bolt 32. The forward end of the cutting blade 31 is provided with teeth 33 to co-act with the teeth 12. Mounted upon the cutter blade 31 is a guide device comprising an upright 34 having a slot 35 therein to receive the crank pin 30. The arrangement of these parts is such that the crank pin 30 is so arranged with relation to the pivotal center of the cutting blade 31 that, if extended, it would intersect a line perpendicular to said blade at said pivotal center. Therefore, when the shaft 26 is rotated, the crank pin 30 will operate upon the guide 34 in such a manner as to oscillate the cutting blade 31, there being sufficient play between the crank pin and the slot to prevent binding movements. The shape of the outer end of the arm 11 is such that the oscillating cutter blade 31 will not project beyond the arm at any portion of its stroke. In this way, the oscillating cutter blade is protected from striking against objects adjacent to the side of the cutter blade.

In practical use, it is obvious that the operator may grasp the handle and have the traction wheel 18 resting upon the ground, and he then may, by means of the handle, either permit the inner end of the arm 11 to rest upon the ground, or he may hold it at any desired elevation above the ground so that he may cut grass at any desired distance from the ground. When the trimmer is being advanced in a straight line over the ground, the cutting blade 31 will be oscillated at a comparatively high speed by means of the gearing devices, and when the trimmer is moved rearwardly, the cutter blade will not be operated as the spring actuated ratchet clutch device will permit the traction wheel to move without operating the cutting blade.

One of the most important advantages in connection with the use of my lawn trimmer is that it will cut grass easily and efficiently all around a small object such, for instance, as a bush. In doing this, the operator places the inner end of the arm 11 close to, or even against, the bush or other object, and then moves the traction wheel in a circle around the object. The central portions of the cutting blades are arranged substantially in the perpendicular plane passing through the axis of the traction wheel so that when the traction wheel is moved around in a circle, centered at the inner end of the cutting blades, the cutting blades need not be advanced while the traction wheel is moving in a circle around them and yet the upper blade will be oscillated during such movement. It is obvious that if the central portions of the cutting blades were arranged either in front of or in the rear of a line through the axle of the traction wheel, the above mentioned result could not be accomplished and it would be impossible to cut grass close around a small bush in the manner described.

I claim as my invention.

1. In a device of the class described, the combination of a frame, a handle connected to the frame, a traction wheel in the frame, a shaft extended laterally from the frame, means interposed between the traction wheel and the shaft for imparting a rotary movement to the latter, a horizontally disposed cutter blade fixed to the frame and extended laterally under the shaft and then forwardly and provided at its forward edge with cutter teeth, the central portions of said teeth being substantially in the perpendicular plane passing through the axis of the traction wheel, an oscillating cutter blade mounted upon the stationary one having teeth thereon to co-act with the stationary teeth, a crank on said shaft, a crank pin on the crank arranged in such position that, if extended, it would intersect a line perpendicular to the pivotal point of the oscillating cutter blade, a slotted guide in the oscillating cutter blade to receive said crank pin, substantially as and for the purposes stated.

2. In a device of the class described, the combination of a frame comprising a gear casing, a horizontally disposed stationary cutter plate extended laterally from one side of the gear casing and then forwardly and having cutter teeth formed on its forward end, a handle connected to said frame, an axle mounted in the gear casing, a traction wheel fixed to said axle and having an internal gear, a shaft rotatably mounted in the casing, a pinion thereon to mesh with the internal gear, a larger pinion on the same shaft contained within the gear casing, a spring actuated ratchet device for permitting the traction wheel to turn rearwardly without turning the last mentioned pinion, a shaft mounted in the frame, a small pinion on the shaft in mesh with the last mentioned large pinion, a crank on said shaft, a crank pin fixed to the crank and inclined in a direction, which, if extended, would intersect a line perpendicular to the central portion of the stationary cutter plate, an oscillating cutter plate mounted on the stationary one, a slotted guide on the oscillating cutter plate to receive said crank pin, the cutter teeth on said stationary and oscillating plates being arranged with their central portions substantially in the perpendicular plane passing through the axis of the traction wheel, substantially as and for the purposes stated.

Des Moines, Ia., Apr. 1, 1909.

ORLA H. WATKINS.

Witnesses:
RALPH ORWIG,
MILDRED B. GOLDIZEN.